(12) United States Patent
Greene

(10) Patent No.: US 7,844,697 B1
(45) Date of Patent: Nov. 30, 2010

(54) MEASURING NETWORK TRAFFIC BASED ON PREDICTED AMOUNT OF PADDING

(75) Inventor: Spencer Greene, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2544 days.

(21) Appl. No.: 10/193,194

(22) Filed: Jul. 12, 2002

Related U.S. Application Data

(60) Provisional application No. 60/350,984, filed on Jan. 25, 2002.

(51) Int. Cl.
*G06F 15/173* (2006.01)

(52) U.S. Cl. .................. 709/224; 709/223; 709/232; 709/239; 370/395.1

(58) Field of Classification Search ............. 709/223, 709/224, 225, 232, 238; 370/505
See application file for complete search history.

(56) References Cited

U.S. PATENT DOCUMENTS

| | | | | |
|---|---|---|---|---|
| 5,384,770 A * | 1/1995 | Mays et al. ............... 370/300 |
| 5,850,526 A * | 12/1998 | Chou ........................ 709/247 |
| 5,928,325 A * | 7/1999 | Shaughnessy et al. ...... 709/206 |
| 6,021,117 A * | 2/2000 | Juniper et al. .............. 370/252 |
| 6,085,248 A * | 7/2000 | Sambamurthy et al. ..... 709/229 |
| 6,101,547 A * | 8/2000 | Mukherjee et al. ......... 709/231 |
| 6,112,009 A * | 8/2000 | Kikuchi et al. ............. 386/95 |
| 6,134,383 A * | 10/2000 | Kikuchi et al. ............. 386/95 |
| 6,157,635 A * | 12/2000 | Wang et al. ................ 370/352 |
| 6,233,279 B1 * | 5/2001 | Boon ..................... 375/240.08 |
| 6,263,371 B1 * | 7/2001 | Geagan et al. ............. 709/231 |
| 6,407,680 B1 * | 6/2002 | Lai et al. ..................... 341/50 |
| 6,484,212 B1 * | 11/2002 | Markowitz et al. ......... 709/246 |
| 6,516,350 B1 * | 2/2003 | Lumelsky et al. .......... 709/226 |
| 6,665,706 B2 * | 12/2003 | Kenner et al. .............. 709/203 |
| 6,775,284 B1 * | 8/2004 | Calvignac et al. .......... 370/392 |
| 6,865,150 B1 * | 3/2005 | Perkins et al. ............. 370/230 |
| 6,918,034 B1 * | 7/2005 | Sengodan et al. .......... 713/160 |
| 6,941,378 B2 * | 9/2005 | Apostolopoulos et al. ... 709/231 |
| 6,954,785 B1 * | 10/2005 | Martin et al. ............... 709/223 |
| 6,970,478 B1 * | 11/2005 | Nishihara .................. 370/474 |
| 6,981,029 B1 * | 12/2005 | Menditto et al. ........... 709/217 |
| 6,996,618 B2 * | 2/2006 | Apostolopoulos et al. ... 709/227 |
| 7,200,402 B2 * | 4/2007 | Apostolopoulos et al. ... 455/442 |
| 7,272,122 B2 * | 9/2007 | Trossen et al. ............. 370/331 |
| 7,292,590 B1 * | 11/2007 | Chen et al. ................. 370/401 |
| 2001/0033575 A1 * | 10/2001 | Shimamura et al. ......... 370/419 |
| 2002/0013852 A1 * | 1/2002 | Janik ......................... 709/231 |
| 2002/0021669 A1 * | 2/2002 | Kunito et al. .............. 370/235 |
| 2002/0082015 A1 * | 6/2002 | Wu ........................... 455/436 |
| 2002/0090206 A1 * | 7/2002 | Kikuchi et al. ............. 386/111 |
| 2002/0152305 A1 * | 10/2002 | Jackson et al. ............. 709/224 |
| 2003/0009577 A1 * | 1/2003 | Apostolopoulos et al. ... 709/231 |
| 2003/0046396 A1 * | 3/2003 | Richter et al. ............. 709/226 |
| 2003/0076832 A1 * | 4/2003 | Ni ........................... 370/395.1 |
| 2003/0105806 A1 * | 6/2003 | Gayle et al. ................ 709/203 |

(Continued)

*Primary Examiner*—John Follansbee
*Assistant Examiner*—Backhean Tiv
(74) *Attorney, Agent, or Firm*—Harrity & Harrity, LLP

(57) ABSTRACT

A system measures traffic in a device. The system tracks an amount of data and the data units and predicts the amount of padding associated with the data units. The system determines the amount of traffic in the device based on the predicted padding, the amount of data, and the number of data units.

26 Claims, 8 Drawing Sheets

U.S. PATENT DOCUMENTS

2003/0143985 A1* 7/2003 Yokoyama ................ 455/414
2004/0139157 A1* 7/2004 Neely et al. ................ 709/205
2004/0213291 A1* 10/2004 Beshai et al. ............... 370/473

* cited by examiner

MEASURING NETWORK TRAFFIC BASED ON PREDICTED AMOUNT OF PADDING

RELATED APPLICATION

This application claims priority under 35 U.S.C. §§119 and/or 365 to U.S. Provisional Patent Application No. 60/350,984, filed on Jan. 25, 2002; the entire content of which is hereby incorporated by reference herein.

BACKGROUND OF THE INVENTION

1. Field of the Invention

The present invention relates generally to data communications, and more particularly, to measuring traffic in a communications network.

2. Description of Related Art

Service providers desire the ability to measure network traffic transmitted through network routers, including layer 2 (L2) headers, framing information, and padding information, on a per-customer (or per-flow) basis. In many routers, a layer 3 (L3) forwarding subsystem performs the per-customer accounting functions. In these routers, however, a receive line card typically strips incoming packets of the L2 overhead before the packets are transmitted to the L3 forwarding subsystem. Therefore, the L3 forwarding subsystem is not able to consider the L2 overhead when performing the per-customer accounting.

Similarly, when a packet is to be transmitted from a router, the L3 forwarding subsystem generally performs the per-customer accounting. The L3 forwarding subsystem then passes the packet to the line card where the L2 overhead information is added. In such a system, the L3 forwarding subsystem does not consider the L2 overhead information when performing per-customer accounting.

It is, therefore, desirable to improve per-customer accounting in a network device.

SUMMARY OF THE INVENTION

Systems and methods consistent with the principles of the invention address this and other needs by accounting for L2 overhead when performing per-customer accounting.

One aspect consistent with principles of the invention is directed to a method that measures traffic in a device. The method includes tracking the amount of data and the number of data units and predicting the amount of padding associated with the data units. The method also includes determining the amount of traffic in the device based on the predicted padding, the amount of data, and the number of data units.

A second aspect consistent with principles of the invention is directed to a network device that includes a first processing unit and a second processing unit. The first processing unit processes data to form data units, predicts an amount of padding to be added to the data units, and calculates an amount of traffic in the network device based on the predicted amount of padding. The second processing unit adds the predicted amount of padding to the data units.

A third aspect consistent with principles of the invention is directed to a method for predicting padding in a network device. The method includes detecting a size of a data unit, receiving a minimum size parameter, and predicting an amount of padding associated with the data unit based on the size of the data unit and the minimum size parameter.

A fourth aspect consistent with principles of the invention is directed to a system that includes a first memory that stores a minimum size parameter, a second memory, having a group of entries, where each entry stores a pad count, and at least one computation unit. The computation unit connects to the first memory and the second memory and is configured to receive a data unit size value, predict an amount of padding associated with the data unit based on the data unit size value and the minimum size parameter, and store the amount of padding in one of the entries of the second memory.

A fifth aspect of the invention is directed to system that includes a first memory that stores at least one minimum size parameter, a second memory, having at least one entry that stores a pad count, and a group of computation units. The computation units connect to the first memory and the second memory and are associated with at least two different communication protocols. Each computation unit receives a data unit size value, and predicts an amount of padding associated with the data unit based on the data unit size value and the one minimum size parameter.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a system improves per-customer accounting in a network device. In one implementation consistent with principles of the invention, an L3 forwarding subsystem predicts the L2 overhead that will be added to packets prior to transmission and the L3 overhead stripped from packets upon receipt. The L3 forwarding subsystem may then account for this overhead when performing per-customer accounting. It will be appreciated that the techniques described herein are equally applicable to per-flow accounting, where an individual "flow" is defined as a set of packets that satisfies any classifier criteria, such as matching one of a set of L3/L4 header patterns, or belonging to a certain multi-protocol label switching (MPLS) label switched path (LSP), etc.

System Configuration

Figure 1:
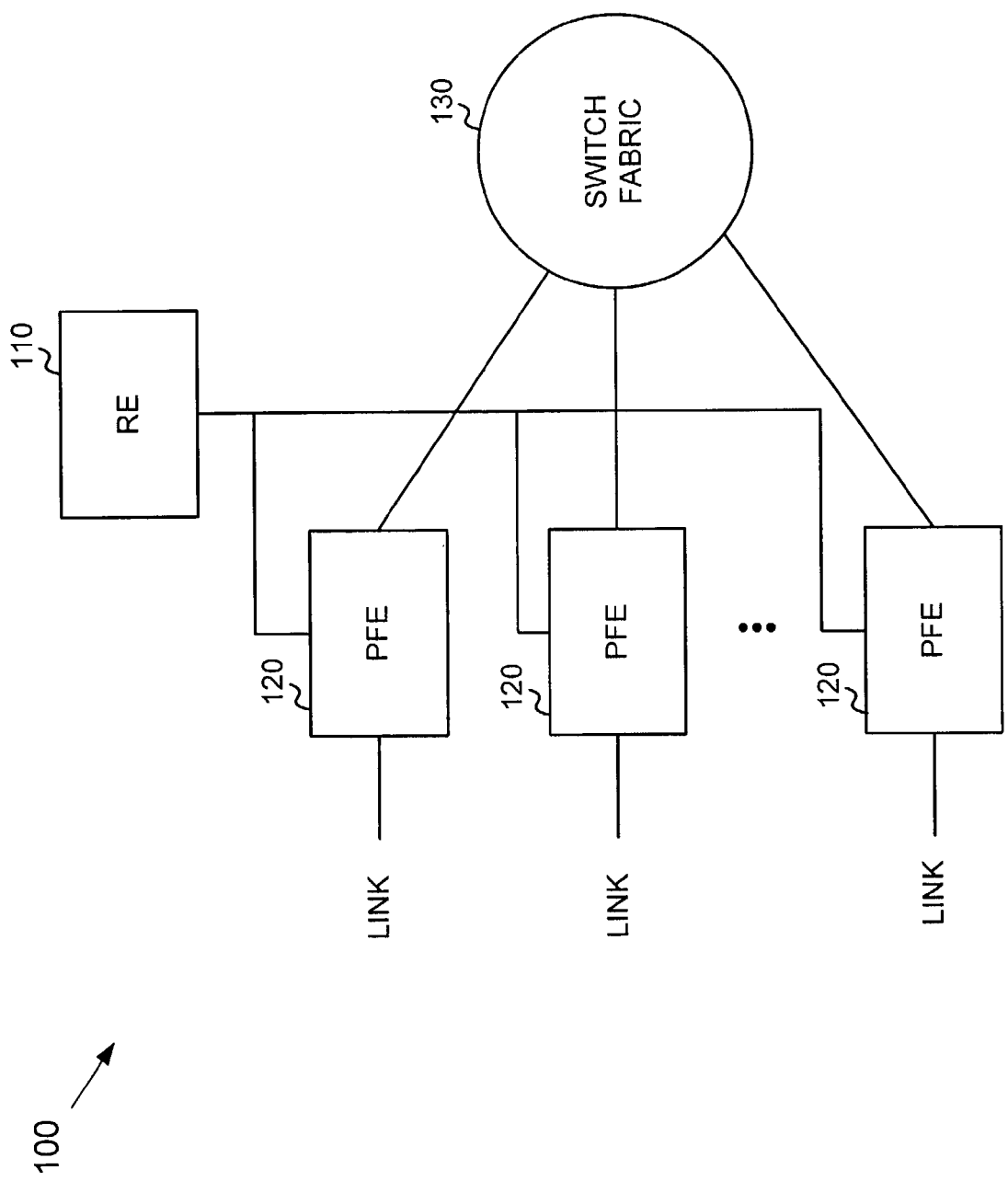
FIG. 1 is a diagram of an exemplary network device in which systems and methods consistent with the principles of the invention may be implemented.

FIG. 1 is a diagram of an exemplary network device in which systems and methods consistent with the principles of the invention may be implemented. In this particular implementation, the network device takes the form of a router 100. Router 100 may receive one or more packet streams from a physical link, process the stream(s) to determine destination information, and transmit the stream(s) on one or more links in accordance with the destination information.

Router 100 may include a routing engine (RE) 110 and multiple packet forwarding engines (PFEs) 120 interconnected via a switch fabric 130. Switch fabric 130 may include one or more switching planes to facilitate communication between two or more of PFEs 120. In an implementation consistent with the principles of the invention, each of the switching planes includes a three-stage switch of crossbar elements.

RE 110 performs high level management functions for router 100. For example, RE 110 communicates with other networks and systems connected to router 100 to exchange information regarding network topology. RE 110 creates routing tables based on network topology information, creates forwarding tables based on the routing tables, and sends the forwarding tables to PFEs 120. PFEs 120 use the forwarding tables to perform route lookups for incoming packets. RE 110 also performs other general control and monitoring functions for router 100.

Each of PFEs 120 connects to RE 110 and switch fabric 130. PFEs 120 receive packets on physical links connected to a network, such as a wide area network (WAN) or a local area network (LAN). Each physical link could be one of many types of transport media, such as optical fiber or Ethernet cable. The packets on the physical link are formatted according to one of several layer 2 protocols, such as the point-to-point protocol (PPP), asynchronous transfer mode (ATM) or Ethernet.

Figure 2:
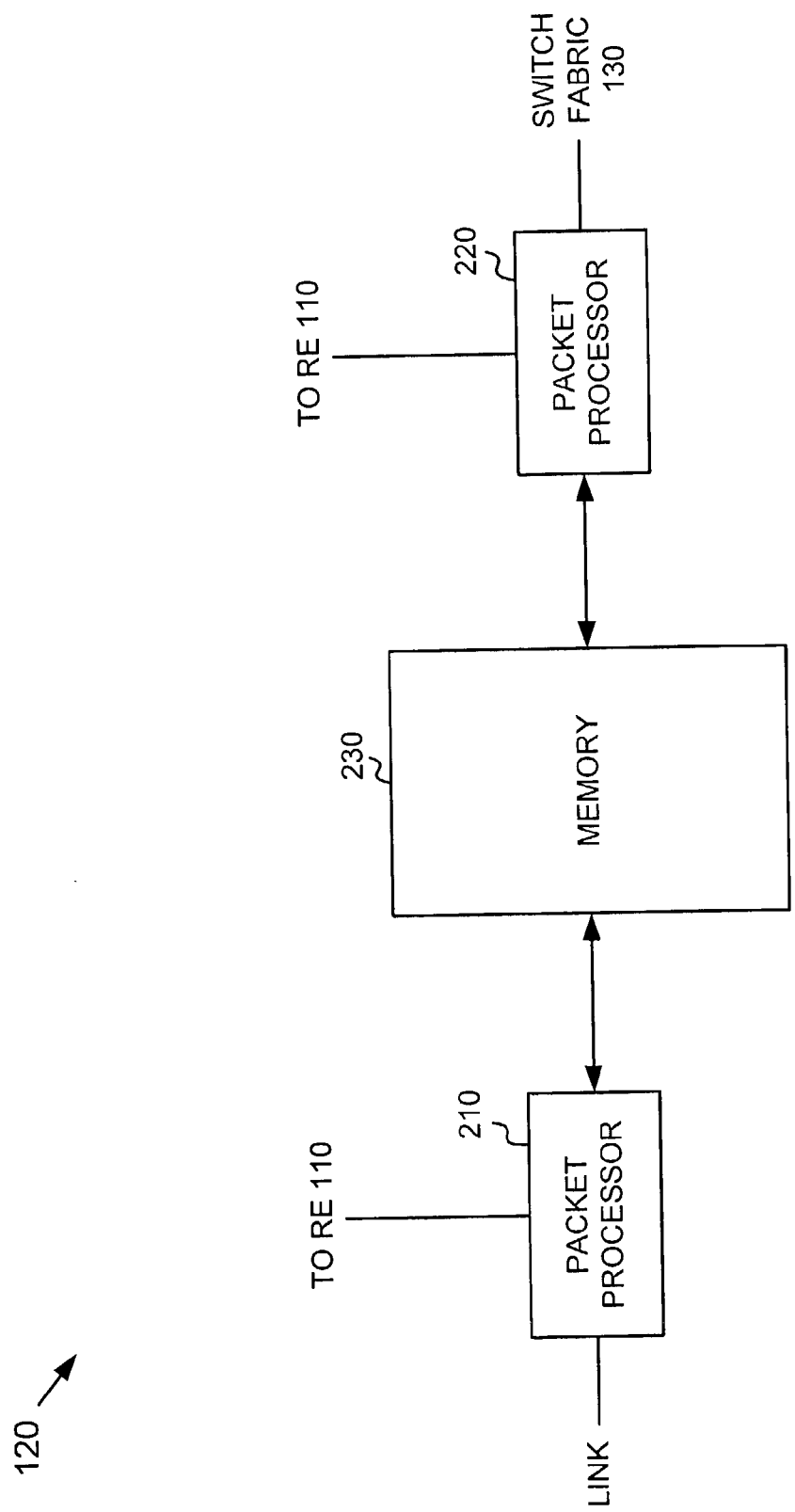
FIG. 2 is an exemplary diagram of a packet forwarding engine according to an implementation consistent with the principles of the invention.

FIG. 2 is an exemplary diagram of a PFE 120 according to an implementation consistent with the principles of the invention. PFE 120 may include two packet processors 210 and 220 connected to a memory 230 and RE 110. Packet processor 210 connects to the WAN or LAN physical links. Packet processor 210 may process packets received from the WAN/LAN links and prepare packets for transmission on the WAN/LAN links. For example, packet processor 210 may perform route lookups based on packet header information to determine destination information for the packets and add layer 3 (L3) and layer 2 (L2) headers to the packets. For packets received from the WAN/LAN, packet processor 210 may strip the L2 and L3 headers from the packets and store the resulting packet data in memory 230. For packets to be transmitted on the WAN/LAN, packet processor 210 may read data from memory 230.

Packet processor 220 connects to switch fabric 130. Packet processor 220 may process packets received from switch fabric 130 and prepare packets for transmission to switch fabric 130. For packets received from switch fabric 130, packet processor 220 may store data in memory 230. For packets to be transmitted to switch fabric 130, packet processor 220 may read data from memory 230.

Figure 3:
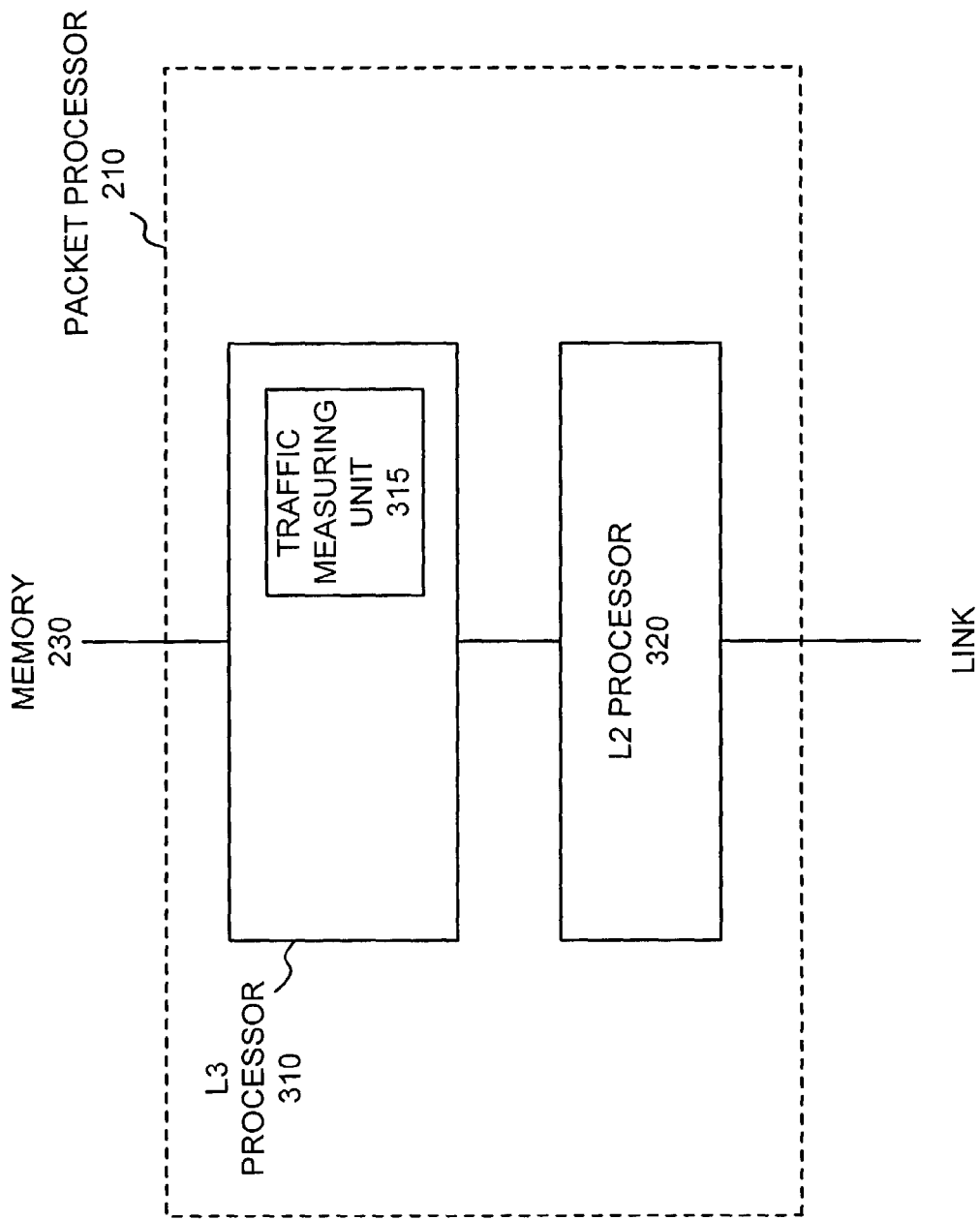
FIG. 3 is an exemplary illustration of a packet processor according to an implementation consistent with principles of the invention.

FIG. 3 is an exemplary illustration of packet processor 210 according to an implementation consistent with principles of the invention. While described primarily in an Ethernet environment, it will be appreciated that the traffic measuring techniques described herein are equally applicable to other communication environments, such as an ATM environment. Moreover, while the following description focuses on measuring traffic transmitted to the WAN/LAN, it will be appreciated that the techniques described herein may also be applied to measuring traffic received from the WAN/LAN.

As illustrated, packet processor 210 may include an L3 processor 310 and an L2 processor 320. Although not illustrated in FIG. 3, L3 processor 310 and L2 processor 320 may be remotely located (e.g., they may be located on separate plug-in cards). Packet processor 210 may include additional devices (not shown) that aid packet processor 210 in receiving, transmitting, or processing data.

L3 processor 310 reads data from memory 230 and forms one or more packets therefrom. L3 processor 310 may create an L3 packet header from the information read from memory 230 and add the L3 header to the packets.

L2 processor 320 receives packets from L3 processor 310 and adds L2 headers and padding, if necessary, to the packets. L2 processor 320 may create the L2 frame header from the information read from memory 230. L2 processor 320 may add padding to the packet to bring the length of the frame up to a minimum value required by the particular communication protocol being implemented by router 100. For example, the Ethernet protocol may require that each frame be a minimum of 64 bytes. L2 processor 320 may pad a packet to ensure that the frame satisfies this minimum requirement.

L3 processor 310 may include a traffic measuring unit 315 that measures the amount of traffic transmitted to and received from the WAN/LAN. To properly measure the traffic being transmitted to the WAN/LAN, traffic measuring unit 315 predicts the size of the L2 header and the amount of padding to be added by L2 processor 320. To measure the traffic received from the WAN/LAN, traffic measuring unit 315 calculates what the size of the L2 header was and the amount of padding stripped from the packets by L2 processor 320.

Figure 4:
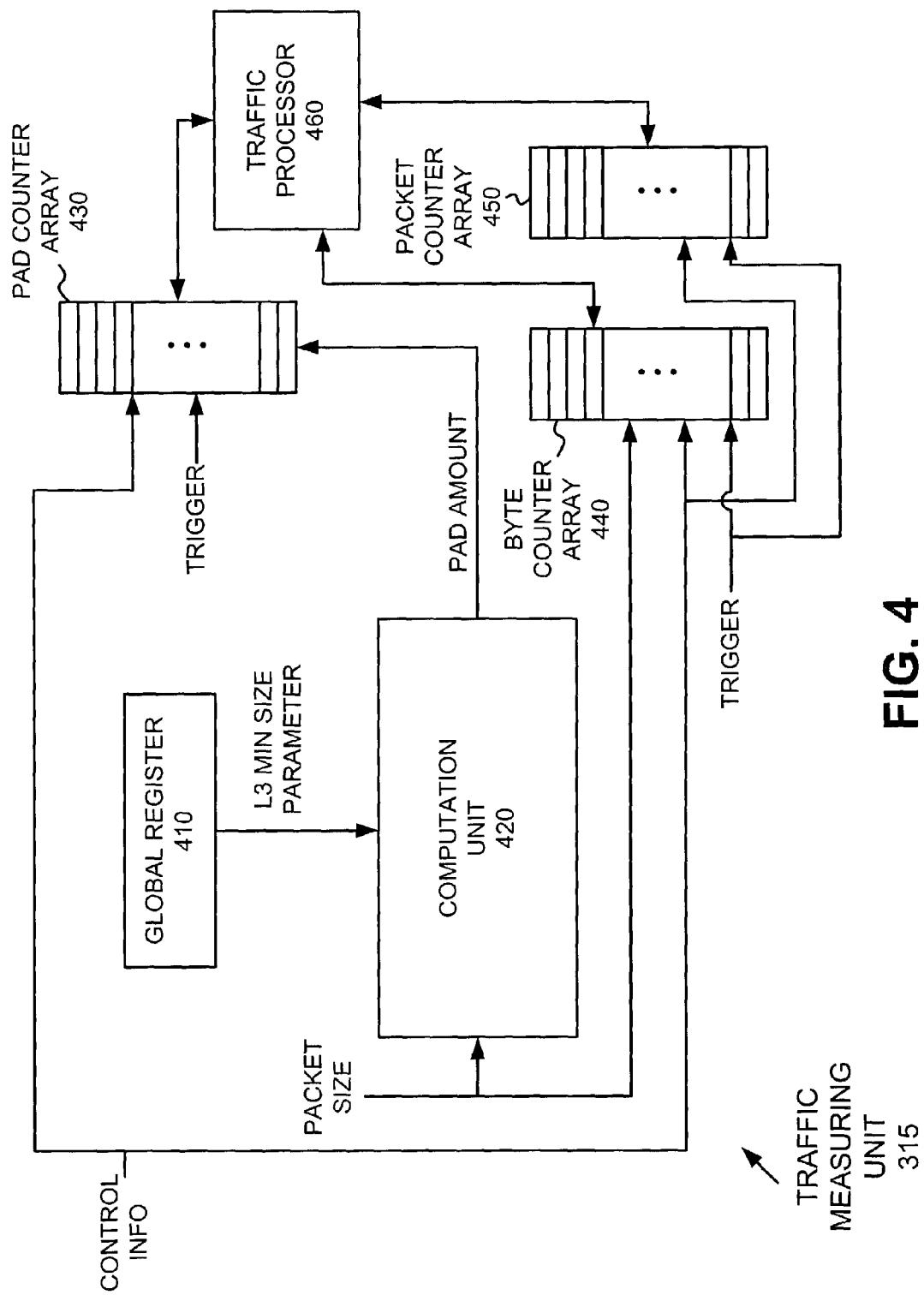
FIG. 4 is an exemplary illustration of a traffic measuring unit according to an implementation consistent with the principles of the invention.

FIG. 4 is an exemplary illustration of traffic measuring unit 315 according to an implementation consistent with the principles of the invention. As illustrated, traffic measuring unit 315 includes a global register 410, a computation unit 420, a pad counter array 430, a byte counter array 440, a packet counter array 450, and a statistics processor 460.

Global register 410 stores a parameter representing the minimum size of L3 packets. This parameter may be determined based on the minimum size of L2 frames and the known size of the L2 header. For example, if the minimum size of the L2 frames is 64 bytes and the L2 header is 12 bytes, then the L3 minimum size parameter would be set to 52 bytes.

Computation unit 420 receives information regarding the size of a packet (e.g., in bytes) and the minimum L3 size parameter from global register 410 and determines the adjusted pad amount to be added to the packet based thereon. Computation unit 420 may receive the packet size value from another device, such as a counter, in router 100 or may determine the packet size itself using well-known techniques.

Figure 5:
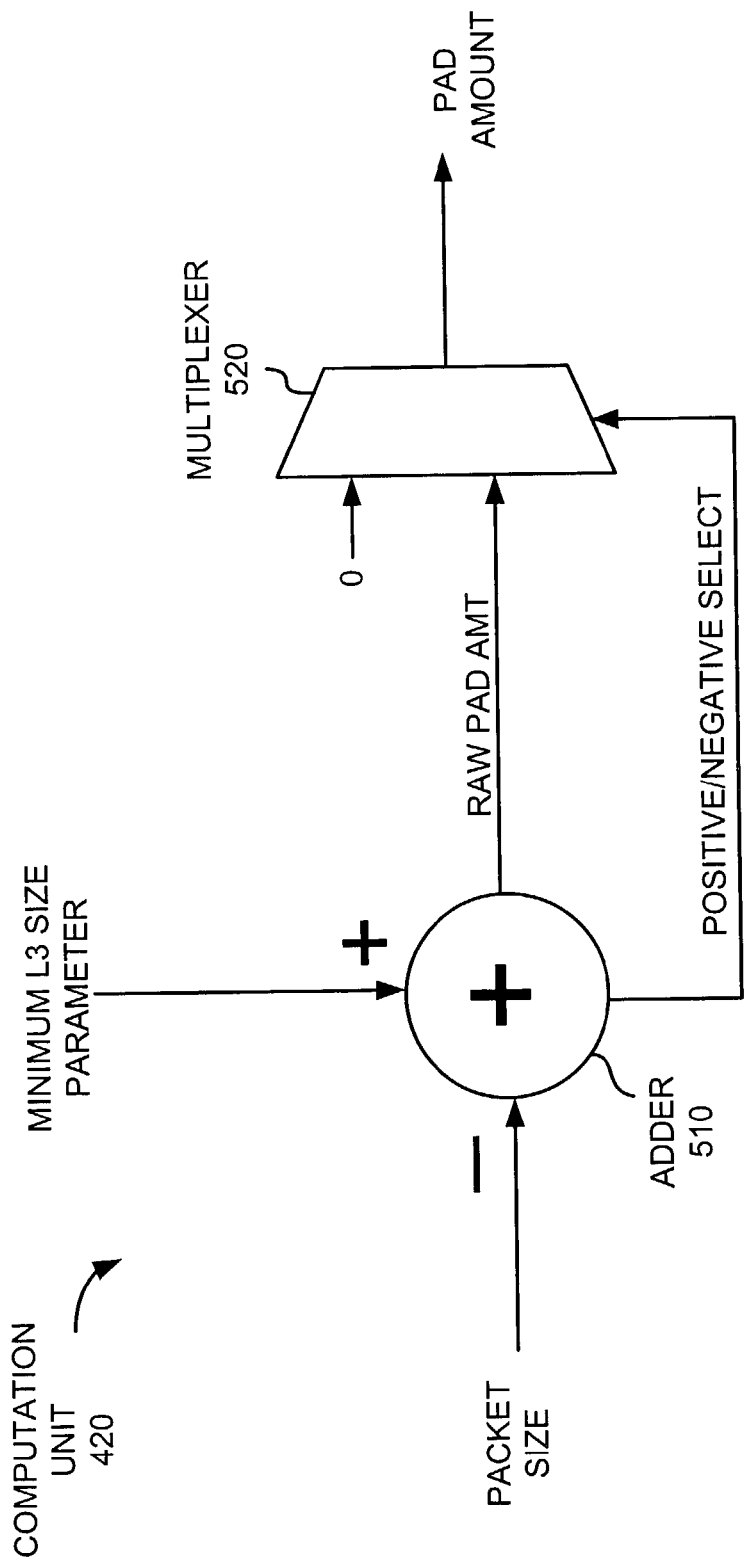
FIG. 5 is an exemplary illustration of a computation unit in an implementation consistent with the principles of the invention.

FIG. 5 is an exemplary illustration of computation unit 420 in an implementation consistent with the principles of the invention. As illustrated, computation unit 420 includes an adder 510 and a multiplexer 520.

Adder 510 adds the minimum L3 size parameter to the inverse of the packet size to produce a value representing the raw pad amount. The raw pad amount is the amount of padding (e.g., in bytes) that will be added to the packet by L2 processor 320 to bring the packet to the minimum size required by the particular protocol used by router 100. Adder 510 provides the raw pad amount to multiplexer 520. Adder 510 also provides a select signal to multiplexer 520 that represents whether the addition of the minimum L3 size parameter and the inverted packet size results in a negative or positive value.

Multiplexer 520 outputs the raw pad amount when the addition of the minimum L3 size parameter and the inverted packet size results in a positive value and outputs a "0" when a negative value results.

Returning to FIG. 4, pad counter array 430 includes a group of counters that tracks the amount of padding associated with packets that have been transmitted or received. The number of counters may vary. For example, the number of counters in pad counter array 430 may correspond to the number of streams by which router 100 receives and transmits packets. Alternatively, the number of counters in pad array 430 may correspond to different levels of priority that router 100 handles or to different customers associated with a service provider.

Pad counter array 430 receives a trigger that indicates when an end of a packet has been detected, control information, and the pad amount from computation unit 420. The control information may include an address or index value that identifies a counter in the counter array that corresponds to the particular stream by which the packet is to be transmitted by router 100. In response to receiving the trigger, pad counter array 430 fetches the counter value in the counter identified by the control information, adds the pad amount, and writes back the result to the counter.

Byte counter array 440 includes a group of counters that tracks the number of bytes in L3 packets transmitted or received. Each counter in array 440 may correspond to a counter in pad counter array 430. Byte counter array 440 receives the trigger, the control information, and the packet size. In response to receiving the trigger, byte counter array 440 fetches the counter value in the counter identified by the control information, adds the packet size, and writes back the result to the counter.

Packet counter array 450 includes a group of counters that tracks the number of packets transmitted or received by router 100. Each counter in array 450 may correspond to a counter in pad counter array 430. Packet counter array 450 receives the trigger and the control information. In response to receiving the trigger, packet counter array 450 fetches the counter value in the counter identified by the control information, adds one to the counter value, and writes back the result to the counter.

Statistics processor 460 receives counter values from pad counter array 430, byte counter array 440, and packet counter array 450 and determines the total amount of traffic based thereon. Statistics processor 460 may determine the total amount of traffic for a particular set of counters as follows:

Total Traffic=(fixed L2 header size×packet counter)+ byte counter+pad counter.

Once statistics processor 460 has determined the amount of traffic (i.e., the total L2 bytes) for a particular set of counters, statistics processor 460 may reset that particular set of counters. Statistics processor 460 may determine the amount of traffic automatically (e.g., at predetermined periods of time) or in response to an input by a user. The traffic amounts may be stored for later analysis and/or customer billing.

It will be appreciated that, as an alternative to the above, pad counter array 430 could be incorporated into byte counter array 440. In such an implementation, each counter in the byte/pad counter array would track both the number of bytes and the pad amount in separate bit fields for example, or as a single aggregate total value if the L3 count value is not needed.

Figure 6:
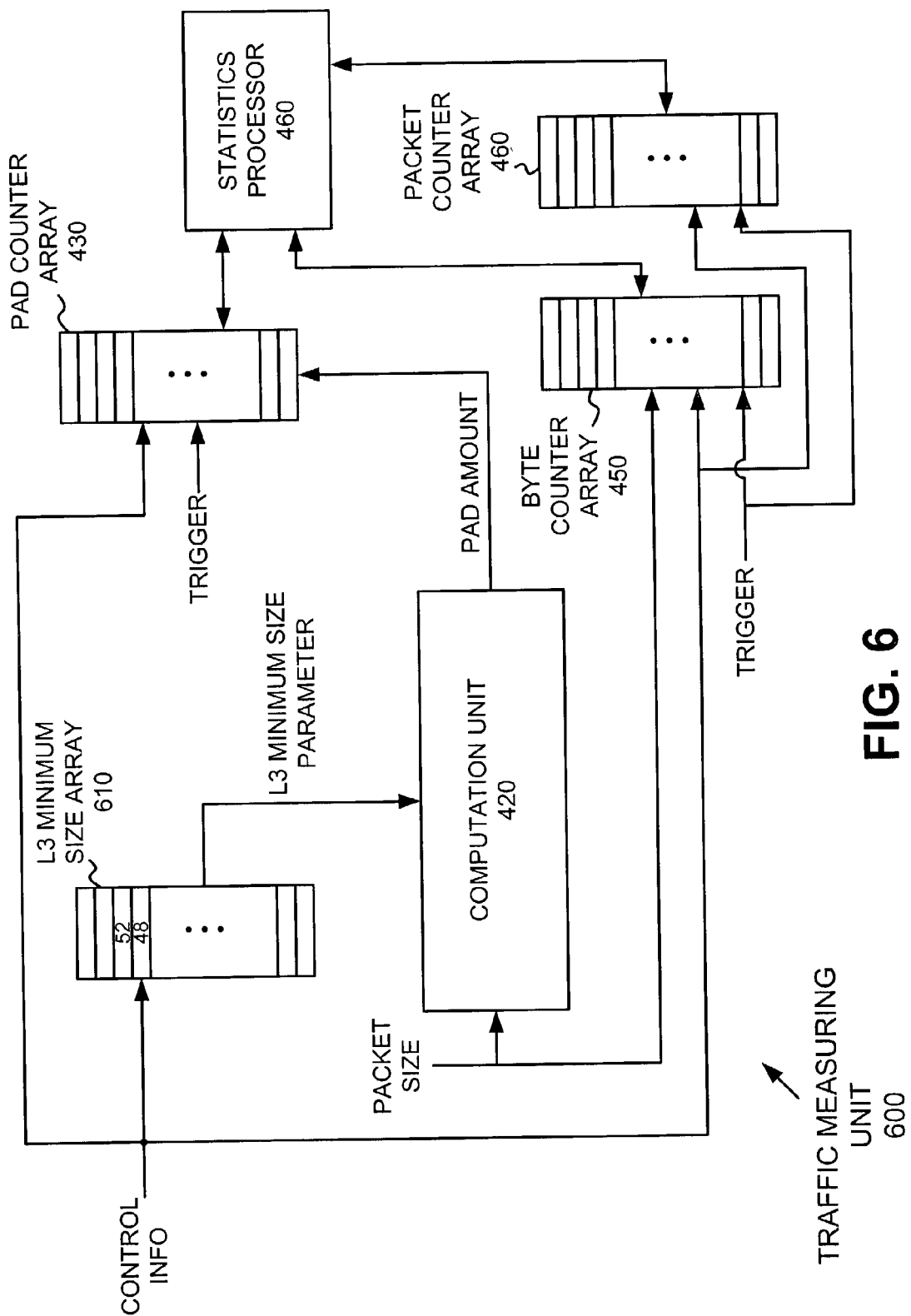
FIG. 6 is an exemplary diagram of the traffic measuring unit in an alternative implementation consistent with the principles of the invention.

FIG. 6 is an exemplary diagram of traffic measuring unit 600 in an alternative implementation consistent with the principles of the invention. As illustrated, global register 410 of FIG. 4 has been replaced with a L3 minimum size array 610.

L3 minimum size array 610 may include a group of entries corresponding, for example, to the different packet streams by which router 100 transmits and receives packets. The minimum size of L3 packets may vary from stream to stream. For example, assume that the minimum L2 packet size is 64 bytes. If the Ethernet L2 header is 12 bytes for packets transmitted in a first stream, then the minimum L3 packet size for that stream would be 52 bytes. Assume that VLAN data is included in the L2 header for packets transmitted via a second stream and that this VLAN data is 4 bytes. The minimum L3 packet size for packets transmitted in this second stream would then be 48 bytes.

L3 minimum size array 610 receives the control information and transmits the L3 minimum size parameter from the appropriate entry to computation unit 420. Computation unit 420 may then determine the padding for a particular packet based on the received L3 minimum size parameter.

Exemplary Processing

Figure 7:
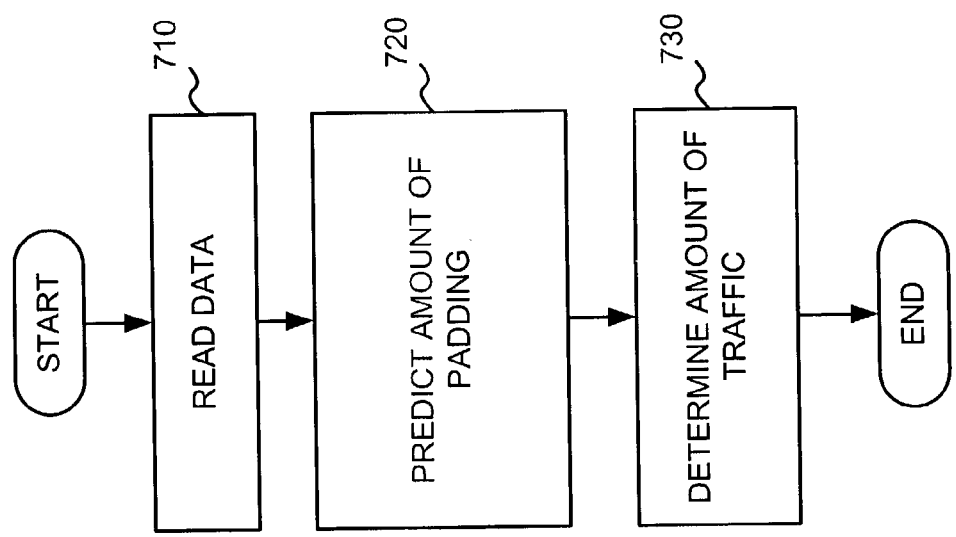
FIG. 7 is a flowchart of an exemplary process for measuring traffic in an implementation consistent with principles of the invention.

FIG. 7 is a flowchart of an exemplary process for measuring traffic in an implementation consistent with principles of the invention. Processing may begin with packet processor 210 reading data from memory 230 [act 710]. L3 processor 310 may process the data in a well-known manner. For example, L3 processor 310 may extract certain information and packet data from the read data, and create one or more packets based on the extracted information. L3 processor 310 may also create the L3 header information based on the extracted information. L3 processor 310 may load the packet data portion of the packets with the packet data from the read data.

Traffic measuring unit 315 may monitor and measure traffic as packets are transmitted from or received by router 100. To do so, traffic measuring unit 315 may predict the amount of padding that will be added to or stripped from the packets by L2 processor 320 [act 720]. As described above, L2 processor 320 may add padding to packets in order to bring the size of the packet up to a minimum size required by the particular protocol implemented by router 100. L2 processor 320 may also strip the L2 overhead from packets received from the network.

To predict the amount of padding added to or stripped from packets, traffic measuring unit 315 may subtract the packet size from a minimum L3 size parameter. The L3 size minimum parameter may be determined based on the size of the L2 header. For example, if the L2 header is 12 bytes and the minimum packet size is 64 bytes, then the L3 minimum size parameter would be 52 bytes. In those situations where the L2 header includes additional control information, such as a VLAN tag, the L3 minimum size parameter may be varied to take this control information into account. For example, if a 4-byte VLAN tag is to be or was included, the L3 minimum size parameter would be 48 bytes.

The difference between the L3 minimum size parameter and the packet size represents the amount of padding that will be added to the packet prior to transmission or the amount of padding that was stripped from the packet when it was received. In those situations where the L3 minimum size parameter is equal to or less than the packet size, traffic measuring unit 315 determines that no padding will be added.

The amount of padding needed in an ATM environment may be predicted in a similar manner. In an ATM environment, packets may be broken up into cells of 48 bytes each. If a packet's size is 100 bytes, then the packet may be broken down into three cells, two cells having 48 bytes of data and the third cell having 4 bytes. To bring the third cell up to the minimum 48 byte size requirement, 44 bytes of padding may be added. Traffic measuring unit 315 may predict the padding in an ATM environment as follows:

Amount of Padding=(cell size−1)−[(*L*3 packet size+ *AAL*5 header size)mod cell size], where AAL5 represents the ATM Adaptation Layer 5 header and "mod" refers to the modulo operation. In the event that the sum of the packet size and AAL5 header size is equal to the cell size, traffic measuring unit 315 may determine that no padding will be added. It is possible to avoid the above computation and store the accumulation of (*L*3 packet size+*AAL*5 header size)mod cell size=last cell penetration.

The total padding count can then be determined by:

((cell size−1)×packet count)−Σlast cell penetration.

Traffic measuring unit 315 may store the predicted amount of padding in memory. In one embodiment, traffic measuring unit 315 tracks the amount of padding to be added to packets (or cells) based on, for example, the priority of the packets or the particular stream by which the packets will be transmitted. Traffic measuring unit 315 may also track the number of bytes and the number of packets to be transmitted from router 100. Traffic measuring unit 315 determines the amount of traffic, including L2 headers, framing, and padding, being transmitted over any period of time as follows:

Total Traffic=(fixed *L*2 header size×packet counter)+ byte counter+pad counter.

Once traffic measuring unit 315 has determined the amount of traffic for any period of time, traffic measuring unit 315 may clear the corresponding entries in memory. Traffic measuring unit 315 may determine the amount of traffic automatically (e.g., at predetermined periods of time) or in response to an input by a user. The traffic amounts may be stored for later analysis and/or customer billing.

Additional Implementation

Figure 8:
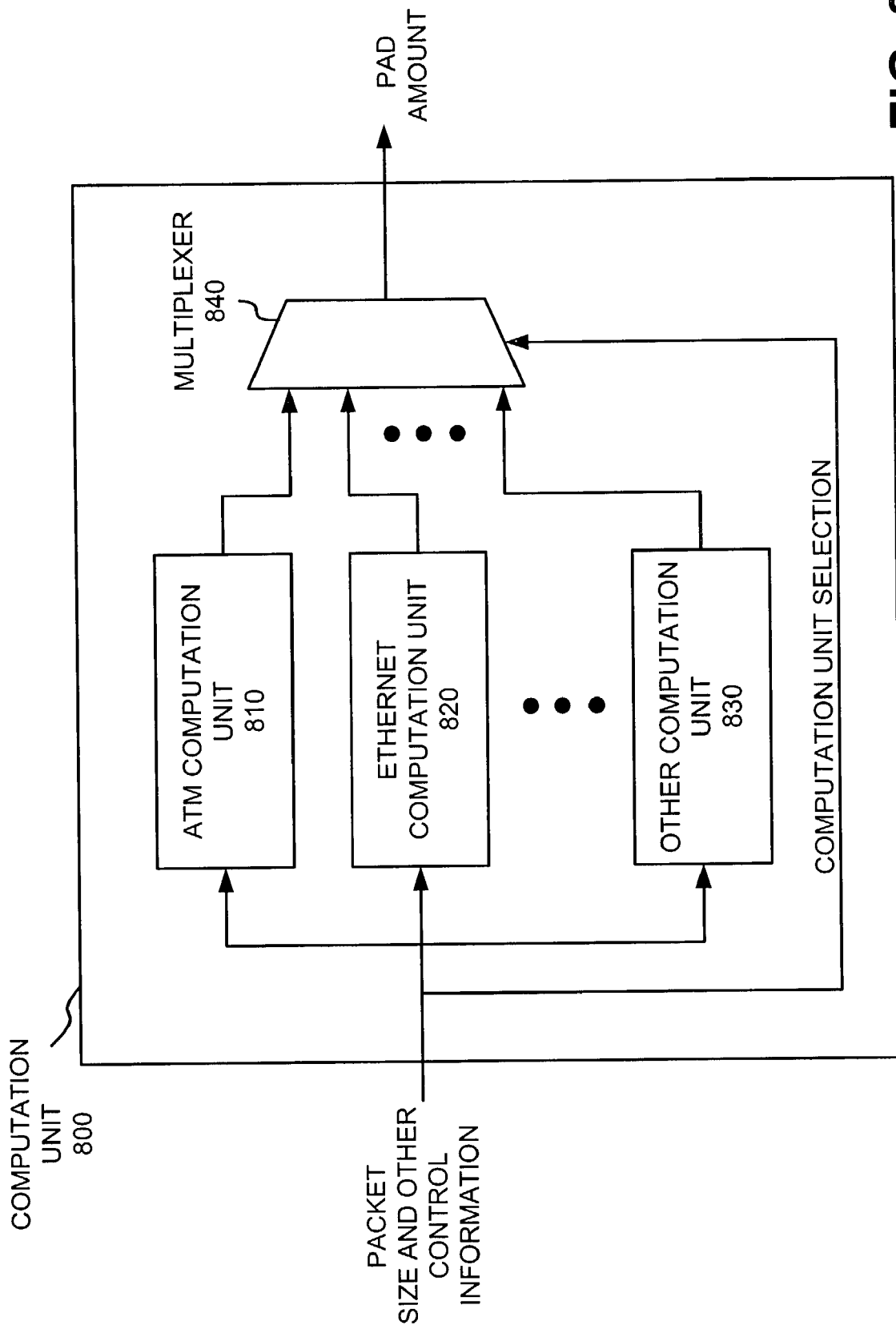
FIG. 8 is an exemplary alternative configuration of the computation unit according to an implementation consistent with principles of the invention.

FIG. 8 is an exemplary alternative configuration of the computation unit according to an implementation consistent with principles of the invention. As illustrated, computation unit 800 includes a number of computation units 810-830 and a multiplexer 840.

Computation units 810-830 may predict the amount of padding associated with packets based on the communication protocol by which the packets will be processed. Computation unit 810, for example, predicts padding for cells transmitted/received in an ATM environment and computation unit 820 predicts padding for packets transmitted/received in an Ethernet environment. Computation unit 800 may include other computation units 830 dedicated to predicting padding for other communication protocols. Other computation units 830 may also include other ATM or Ethernet computation units that allow for parallel processing or redundant operations.

Multiplexer 840 receives the padding amounts from computation units 810-830 and outputs one of the padding amounts based on a computation unit selection signal. The computation unit selection signal may be received from another device in router 100 based on an identification of the type of protocol by which data is to be processed.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, although embodiments consistent with the principles of the invention count bytes, any unit of length to determine an amount of data could also be used, such as a number of bits or words comprising multiple bytes. Also, while a series of acts has been described in FIG. 7, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for measuring traffic, comprising: tracking an amount of data and a number of data units; predicting an amount of padding associated with the data milts; and determining an amount of traffic based on the predicted padding, the amount of data, and the number of data units.

2. The method of claim 1 wherein the data units include packets, and wherein the predicting includes: determining the amount of padding on a per packet basis.

3. The method of claim 2 wherein the determining the amount of padding includes: determining the amount of padding by subtracting the amount of data for a particular packet from a parameter.

4. The method of claim 3 wherein the parameter includes a minimum layer 3 (L3) size parameter.

5. The method of claim 4 further comprising: determining the minimum L3 size parameter based on a minimum packet size parameter and a layer 2 (L2) header size.

6. The method of claim 1 wherein the data units include asynchronous transfer mode (ATM) cells, and wherein the predicting includes: determining the amount of padding on a per AAL frame basis.

7. The method of claim 6 wherein the determining the amount of padding includes: determining the amount of padding based on a cell size, a packet size, and an ATM adaptation layer (AAL) header size.

8. The method of claim 1 further comprising: tracking the predicted amount of padding in a counter for a period of time.

9. The method of claim 1 wherein the determining the amount of traffic includes: determining an amount of traffic based on a layer 2 (L2) header size, the number of data units, the amount of data, and the predicted amount of padding.

10. The method of claim 1 wherein the determining the amount of traffic includes: determining the amount of traffic for a plurality of different communication protocols.

11. A network device comprising: a first processing unit configured to: process data to form data units, predict an amount of padding to be added to the data units, and calculate an amount of traffic in the network device based on the predicted amount of padding; and a second processing unit configured to: add the predicted amount of padding to the data units.

12. The network device of claim 11 wherein, when processing the data, the first processing unit is configured to: perform layer 3 processing on the data to form packets.

13. The network device of claim 11 wherein the first processing unit is further configured to: track an amount of data and data units for a period of time.

14. The network device of claim 13 wherein the data units include packets, and wherein the first processing unit predicts the amount of padding on a per packet basis.

15. The network device of claim 14 wherein the first processing unit predicts the amount of padding by subtracting an amount of data for a packet from a parameter.

16. The network device of claim 15 wherein the parameter includes a minimum layer 3 (L3) size parameter.

17. The network device of claim 11 wherein the data units include asynchronous transfer mode (ATM) cells, and wherein the first processing unit predicts the amount of padding on a per AAL frame basis.

18. The network device of claim 17 wherein the first processing unit predicts the amount of padding based on a cell size, a packet size, and an ATM adaptation layer (AAL) header size.

19. The network device of claim 11 wherein the second processing unit adds padding to the data units to bring the data units up to a minimum size value.

20. The network device of claim 11 wherein the first processing unit includes: a plurality of computation units, at least two of the computation units configured to predict the amount of padding to be added to data units for a different communication protocol.

21. The network device of claim 20 wherein at least one of the plurality of computation units predicts the amount of padding to be added to data units in an Ethernet environment and at least one other communication unit predicts the amount of padding to be added to data units in an asynchronous transfer mode (ATM) environment.

22. The network device of claim 11 wherein the first processing unit includes: a pad counter array configured to track a plurality of predicted padding amounts.

23. The network device of claim 22 wherein the first processing unit further includes: a counter array configured to track an amount of data over a period of time, and a data unit counter array configured to track a number of data units over the period of time.

24. The network device of claim 23 wherein each counter in the pad counter array, counter array, and data unit counter array corresponds to a different stream or flow via which the network device transmits the data units.

25. The network device of claim 23 wherein each counter in the pad counter array, counter array, and data unit counter array corresponds to a different level of priority.

26. A network device comprising: means for tracking a length and a number of data units; means for predicting an amount of padding associated with data units; and means for determining an amount of traffic in the network device based on the predicted padding, the length, and the number of data units.

* * * * *